UNITED STATES PATENT OFFICE.

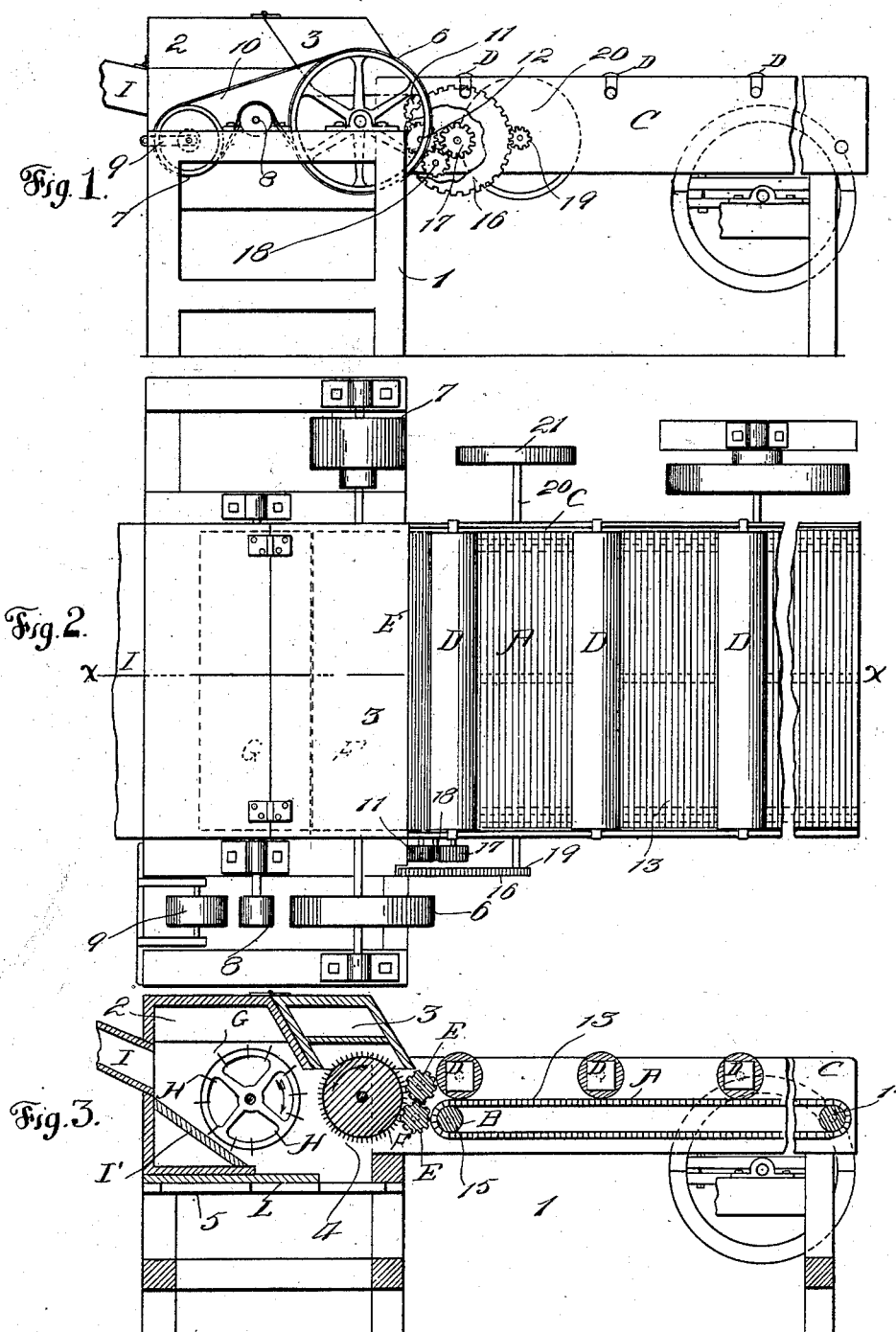

JOHN W. MORGAN, OF SAN ANTONIO, TEXAS, ASSIGNOR, BY DIRECT AND MESNE ASSIGNMENTS, TO THE TENNESSEE FELT MANUFACTURING COMPANY, OF WEST NASHVILLE, TENNESSEE.

COTTON-PICKER FOR FORMING MATTRESS-BATS.

SPECIFICATION forming part of Letters Patent No. 698,535, dated April 29, 1902.

Application filed April 26, 1898. Serial No. 678,892. (No model.)

*To all whom it may concern:*

Be it known that I, JOHN W. MORGAN, a citizen of the United States of America, and a resident of San Antonio, in the county of Bexar and State of Texas, have invented certain new and useful Improvements in Cotton-Pickers for Forming Mattress-Bats, of which the following is a specification.

My invention is an improved machine for straightening the fibers of lint-cotton and picking the same, and it is especially adapted for use in connection with a machine for making cotton-batting for mattresses, the function of my present improvement being to so prepare the cotton that the same when compressed into mattress-bats will be light and elastic.

My invention consists in the peculiar construction and combination of devices hereinafter fully set forth, and pointed out in the claim.

In the accompanying drawings, Figure 1 is a side elevation of a straightening-machine embodying my improvements. Fig. 2 is a top plan view of the same. Fig. 3 is a vertical longitudinal sectional view of the same, taken on a plane indicated by the line $x\,x$ of Fig. 2.

A suitable frame 1 is provided at one end with an inclosing case 2, having a hinged section 3 on its upper side and an air-inlet opening 4 on its lower side, the size of which opening may be varied by a sliding board L, which is supported and is adapted to be moved on guides 5. A delivery-spout I is on the outer side of the said casing, and in the lower side of the casing, on one side thereof, is an inclined board I', which is disposed between the opening 4 and the inner end of the spout I. In the casing, at one side thereof, is disposed a picker-roller F, which is journaled in the sides of the casing and is provided with peripheral spikes or pins, which in practice are about half an inch long and are placed about half an inch apart. The said picker-roller is disposed under the hinged section 3 of the top of the casing. A blast-cylinder H is located at one side of the picker-roller between the latter and the discharge-spout I and immediately above the board I', said blast-cylinder being provided with peripheral blades G, which coact with the pins or spikes of the picker-roller, as will presently appear. A pulley 6 is placed on one end of the shaft of the picker-roller, and the opposite end of the said shaft has a driving-pulley 7, which may be driven by a suitable source of power through an endless belt. (Not shown.) The blast-cylinder has a pulley 8 on one end of its shaft, which is proximate to the pulley 6 of the picker-roller and is very much smaller than said picker-roller, and beyond said pulley 8 is an idle guide-sheave 9. An endless belt 10 connects the guide-sheave 9 and pulley 6, and the lower lead of said belt passes also over the upper side of pulley 8, and hence when the picker-roller is rotated the blast-cylinder H will be rotated at a much higher rate of speed. In practice the blast-cylinder makes about fifteen hundred revolutions in a minute.

A pair of feed-rollers E, which are longitudinally corrugated and are disposed in engagement with each other one above the other, are located adjacent the outer side of the picker-roller F, and said feed-rollers are provided at one end of their respective shafts with connecting-gears 11 12.

An endless traveling feed-apron 13 is horizontally disposed in the frame 1 and is supported and actuated by rollers 14 15. The roller 15 is provided at one end of its shaft with a spur-wheel 16 and a spur-pinion 17. The latter engages an idle gear-wheel 18, which meshes with the gear 12 and communicates motion to the lower feed-roller from the roller 15, motion being communicated to the upper feed-roller by the gear 11, which meshes with gear 12. The gear-wheel 16 engages a pinion 19 on a shaft 20, which shaft is provided with a pulley 21. The said pulley being rotated by an endless belt imparts motion to the endless traveling feed-apron and to the feed-rollers through the gears hereinbefore described. A series of condenser-rollers B are disposed on the upper side of the endless traveling feed-apron and of suitable weight, the journals of said rollers being disposed in vertical slots D in the sides C of that portion of frame 1 in which the endless feed-apron is disposed.

In operation the raw cotton is placed on the endless traveling feed-apron, passes under the condensing-rollers B, the coaction of said endless traveling feed-apron and said condensing-rollers being to form a bat of the cotton, which bat passes between the coacting corrugated feed-rollers E and from the same to the picker-roller F, said feed-rollers preventing and holding the end of the bat to the action of the picker-roller, the spurs or pins of which open, separate, and straighten the fibers of the cotton and convey the same to the rapidly-revolving blast-cylinder H, the blades G of said rapidly-revolving blast-cylinder serving to stretch and straighten the cotton fibers, and said rapidly-revolving blast-cylinder creates a strong current of air, which carries the straightened fibers through the discharge-spout I, from which they pass into a receptacle or the distributing-box of my improved mattress-making machine, hereinbefore referred to. The action of the cylinder H is such that the blast created by the blades thereof draws the cotton from the picker-roller F and throws it downward against the board I'. The cotton lint is then caught on the board I' by the said blades, which act mechanically to beat the cotton along the board until it passes beyond the action thereof, when it is caught up by the air-blast and pneumatically carried through the spout I. Hence the cotton lint is repeatedly acted upon pneumatically and mechanically and the fibers straightened and cleaned. The sliding board L serves to regulate the strength of the air-current by varying the size of the air-intake opening 4 of the inclosing case. By means of the hinged section 3 of the top of the inclosing case the picker-roller may be uncovered when desirable.

Having thus described my invention, I claim—

In a machine of the class described, the combination of an endless traveling feed-apron, rollers thereon coacting therewith to form and feed a bat, an inclosing casing having a feed-opening on one side, a delivery-opening on the opposite side provided with a spout, an air-inlet bottom opening and an inclined board between said air-inlet opening and said delivery-opening, feed-rollers to which the bat is delivered and located in said feed-opening, a picker-roller coacting with said feed-rollers to draw the bat therefrom, disintegrate the bat and draw the fibers therefrom, and a revoluble blast-cylinder disposed in operative relation to the picker-roller, on the side thereof opposite the feed-rollers and over the said inclined board, said blast-cylinder having peripheral straightening-blades to draw the fibers from the picker-roller and beat the same on and along the inclined board, and create a blast to carry said beaten and straightened fibers through said discharge-spout, substantially as described.

JOHN W. MORGAN.

Witnesses:
OTTO W. WARDEN,
GEORGE B. JOHNSTON.